Patented June 23, 1931

1,811,119

UNITED STATES PATENT OFFICE

ABRAHAM P. FURMAN, OF NEW YORK, N. Y., ASSIGNOR, BY MESNE ASSIGNMENTS, TO CORTICELLI SILK COMPANY, OF NEW LONDON, CONNECTICUT, A CORPORATION OF CONNECTICUT

PROCESS FOR THE TREATMENT OF ANIMAL FIBER AND THE PRODUCT

No Drawing.     Application filed July 13, 1923. Serial No. 651,432.

This invention relates to the treatment of animal fiber, together with the resulting product and includes correlated improvements and discoveries whereby and wherewith the utilization of animal fiber is advanced and the useful qualities thereof are enhanced.

An object of the invention is to effect the production of an animal fiber which is free from scales, irregularities and imperfections, and which shall be uniform throughout as to cross-section.

Another object of the invention is to provide a process whereby the waste occasioned in the manufacture of materials from animal fibers may be fully utilized and rendered in a form which is the full equivalent of natural fiber.

Further objects of the invention are to provide an animal fiber, i. e., the fibroin in silk and keratin in wool, in any desired size or shape and in any desired shade—thus obviating the necessity for subsequent dyeing—and which shall be characterized by an elasticity, coherence and tensile strength of unworked perfect fiber.

Other objects of the invention will in part be obvious and will in part appear hereinafter.

The invention accordingly comprises the several steps and the relation and order of one or more such steps with respect to each of the others, and the products possessing the features and properties, which are exemplified in the following detailed disclosure, and the scope of the application of which will be indicated in the claims.

In the practice of the invention silk, using the treatment of silk as an example and for purposes of concreteness, it being understood that the process is clearly applicable to other animal fibers, including all kinds of silk waste such as mill waste, waste in the unreeling of cocoons, split end cocoons, etc., is placed in a suitable receptacle with a slightly alkalin or soap solution and boiled until the sericin or gum has been dissolved from the fiber leaving only the inner portion of the natural fiber, namely, the fibroin. The silk then is removed from the liquor.

The silk, having been freed from the gum, i. e., sericin, may be washed, passed through wringers until the water is practically all removed and placed in an alkalin solution for a period of time depending upon the temperature and concentration of the solution, which period may vary, for example, from ½ hour to 24 hours. The completion of the action may be adjudged by the readiness with which the fiber dissolves in the solvents.

The silk is then dissolved in a suitable solvent therefor, which solvent may contain an alkali, a salt of a metallic element such as copper, nickel, zinc, all of which have an atomic weight lying between 55 and 68; and an organic substance composed of carbon, hydrogen and oxygen, having from 3 to 8 hydroxyl groups—hereinafter referred to as an "organic substance"—such as glycerine, sucrose, or other non-reducing sugar. The purpose of the organic substance is to permit a greater concentration of the metallic compound in solution and thereby the dissolving power of the solution for fibroin is increased. The amount of the silk fiber or fibroin to be dissolved will depend upon the character of the finished thread desired and upon the pressure and speed of production, i. e., if a thread of double the cross-section of a given thread is to be produced, the speed of production and pressure being the same, the amount of fibroin dissolved in a given volume of the solvent should be double. Likewise, should the speed of production be increased, the concentration of the fibroin solution should be increased. In other words, the degree of concentration of the solution is dependent and is directly proportional to the variables, size of thread desired, pressure and speed of production. The fiber having dissolved completely, the solution is well filtered, whereupon it is ready for the reforming or spinning operation.

The spinning of the fiber, or reprecipitation of fibroin,—it being considered that the production of the silk fiber by the silkworm constitutes a precipitation of fibroin,—is brought about by injecting the same under pressure into a bath containing an agent capable of precipitating fibroin. The composition of the precipitating bath varies according to the nature of the solvent used for dissolving the fibroin. An alkali-containing solvent is used, an acid is used in the precipitating bath, and the precipitating bath may contain an astringent, such as the alums, tannic acid, pyrogallic acid, zinc sulfate, iron perchloride, etc.

The precipitating bath may be provided with a mechanical arrangement for picking up the fibers and maintaining them separate, and the bath may be so dimensioned as to effectuate a complete removal of the chemicals used in the solvent. Upon loss of effectiveness, the metallic elements contained therein, which were present in the solvent, may be recovered therefrom in a form in which they may be directly availed of for subsequent work.

Formation of the fiber in the precipitating bath and removal of constituents of the solvent solution from the formed fiber may be augmented by forming the fiber under the influence of an electric current. Employment of an electric current during formation enable a ready and efficient means for the recovery of metallic elements and obviates the necessity of subsequent procedure for removing and neutralizing substances utilized in the solvent.

The fiber is now preferably passed into a washing bath which may contain a small percentage of either an alkali or an acid, in order to neutralize and remove the precipitating solution contained on the fiber. The fiber thereupon may be passed into another bath containing water and an organic substance. The purpose of the organic substance is to impart elasticity to the fiber, and the concentration depends upon the degree of elasticity desired to be imparted. A plurality of said fibers may be brought together and either twisted or permitted to lie parallel into a single thread. The thread then passes into an oven, and when partially dried may be passed several times around a roller which revolves at a constant speed and the thread is further passed over and around a second roller, which revolves at a speed greater than the speed of the first roller, this speed being so regulated as to give the desired elongation according to the size of the final thread. The thread is then dried, whereupon it is ready for spooling or skeining.

The elongation of the fiber by passing the same over rollers having a given differential in surface speed thus yields a greater yardage per pound of fiber per set of spinners. The elongation of the fiber, above set forth as taking place after the gum bath, may take place at any step in the process subsequent to precipitation. To illustrate, if at the spinners a fiber is being produced which is four times the cross section of the desired finished product, these fibers may be subjected to an elongation which will decrease the diameter to one-fourth its size, this being accomplished by having the second roll revolving at four times the speed of the first roll. Accordingly, fibers of any desired commercial size may be produced. Further fibers may be produced in various shapes, thus they may be of usual circular, of oval, of elliptical cross-section, or flat so as to be ribbon-like.

In order to impart greater strength to the fiber, there may be added to the fiber a hardening agent such as formaldehyde, an alum, a chromate, also the fiber may be treated with such agent, either during the spinning operation or after skeining. Furthermore, the strength of the fiber may be increased by the addition of a gelatinous substance, such as albumen, glue, etc., to the solution containing the same, in which case the precipitation should take place in a bath containing not only an acid, but in addition an astringent.

As illustrative embodiments of a manner in which the invention may be practiced, the following examples are given:

*Example 1.* Take 5 grams of nickel sulfate and dissolve in 200 c. c. of water. Precipitate the nickel by the addition thereto of a solution containing an alkali, as sodium or potassium hydroxide, having a specific gravity of 1.5, the addition of the alkali being continued until no further precipitation ensues. A greenish precipitate results, which is well washed. Ammonium hydroxide, 26° Bé., is added to the precipitate until solution occurs. To this solution add 30 c.c. or its equivalent, of an organic substance, as glycerine, etc., and 20 grams of potassium hydroxide, dissolved in 30 c.c. of water. A greenish colored solution is obtained. Place the fiber in the solution so obtained and digest until it begins to swell and gelatinize, then pour off the excess solution and continuously agitate until the fiber passes into a clear solution of a syrupy consistency, having a golden brown color, whereupon it is ready for the subsequent operations of precipitation, etc.

For precipitation of the fiber from the above solution, the precipitating bath may contain an acid such as a mineral acid, sulphuric and hydrochloric, of a strength which is sufficient to entirely neutralize the solvent present with the dissolved fiber. A concentration of sulphuric acid giving satisfactory results has been found to be 15%.

*Example 2.* Take 5 grams of copper sulfate and dissolve in 200 c.c. of water. The copper is precipitated by the addition of a solution containing an alkali, such as sodium, or potassium hydroxide, whereupon a blue precipitate results. The alkali is added until no further precipitation ensues. The precipitate is then well washed and to it is added 10 c.c. of an organic substance as herein described, and 5 grams of sodium hydroxide dissolved in 20 c.c. of water. A clear deep blue solution results. In 20 c.c. of this solution, there is dissolved 3 grams of fiber, whereupon the same is ready for the subsequent operations. The solution is of a purple color. The method of reprecipitating the fiber is in this case the same as in Example 1.

*Example 3.* Fiber is placed in a hot saturated solution of nickel sulfate. When the fiber is thoroughly saturated, the excess of the solution is removed and the fiber treated with a solution of an alkali, such as sodium or potassium hydroxide having a specific gravity of 1.25. A greenish precipitate is formed upon the fiber but upon the addition of ammonium hydroxide 26° Bé. the precipitate is redissolved and the fiber dissolves with the formation of a golden brown liquid, ammonium hydroxide being added until the green precipitate dissolves. To this solution there may be added 2 c.c. of glycerine, whereupon the same is ready for precipitation and subsequent treatment, as in Example 1.

*Example 4.* The fiber is digested in a saturated solution of copper sulfate until it is thoroughly impregnated, the solution if desired being heated. The excess of saturated copper sulfate solution is removed from the fiber, whereupon said fiber is treated with a solution containing an alkali, as sodium or potassium hydroxide, having a specific gravity of 1.25 and digested until a purple colored solution of syrupy consistency is obtained. Glycerine in the amount of 2 c.c. is then added to the solution. In the foregoing, there may be employed 5 grams of fiber to 5 c.c. of alkalin solution. The solution is then employed for the subsequent treatments, as in Example 1.

*Example 5.* Take 20 c.c. saturated solution nickel ammonium sulfate. Add thereto ammonium hydroxide 26° Bé. until a marked blue color develops. To this solution add 10 c.c. glycerine and 2 grams potassium hydroxide. A green solution results. 1 gram of fiber is then dissolved in the above solution, whereupon it is ready for subsequent treatment, as set forth in Example 1.

For the production of colored fiber requiring no subsequent dyeing prior to manufacture into textile goods, there may be added to the fiber containing solution a dye-stuff of suitable class and shade. When the fiber is reprecipitated in a precipitating bath it will be of the desired color, homogeneous and fast, and due to the thorough incorporation of the coloring matter within and throughout the fiber, the colors so attained will be faster than when obtained in accordance with the usual procedure.

The process accordingly gives a fiber, obtainable from any type of animal fiber, which has a uniform cross-section throughout; which may be a thread of any size desired; and which approaches the elasticity, coherence and tensile strength of the best natural fiber. Furthermore, the process provides a manner in accordance with which short fiber and waste fiber of all kinds may be efficiently and economically brought into a form which permits of its use in the manufacture of goods into which only the perfect fibers enter.

Since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. Process for the manufacture of animal fiber which comprises dissolving animal fiber in an alkalin solution containing a metal having an atomic weight lying between 55 and 68 and an organic substance composed of carbon, hydrogen and oxygen having from 3 to 8 hydroxyl groups, reforming the fiber by precipitation, washing in a bath containing an organic substance as hereinbefore described, and elongating.

2. Process for the manufacture of animal fiber which comprises dissolving animal fiber in an alkalin solution containing a metal having an atomic weight lying between 55 and 68 and glycerine, reforming the fiber by precipitation, washing in a bath containing glycerine, and elongating.

3. Process for the manufacture of silk fiber which comprises removing sericin from silk fiber, dissolving said fiber in a solvent containing an alkali, a metal having an atomic weight lying between 55 and 68 and an organic substance composed of carbon, hydrogen and oxygen and having from 3 to 8 hydroxyl groups, reforming the fiber by precipitation in a bath containing an acid, washing in a bath containing an organic substance as hereinbefore described, and elongating.

4. Process for the manufacture of silk fiber which comprises removing sericin from silk fiber, dissolving said fiber in a solvent containing an alkali, a metal having an atomic weight between 55 and 68 and an organic substance composed of carbon, hydrogen and oxygen and having from 3 to 8 hydroxyl groups, reforming the fiber by injecting the fibroin-containing solution into a precipitating bath containing an acid, washing in a bath containing an organic substance as hereinbefore described, and elongating.

5. Process for the manufacture of silk fiber which comprises removing sericin from silk fiber, dissolving said fiber in a solvent containing an alkali, a metal having an atomic weight between 55 and 68 and an organic substance composed of carbon, hydrogen and oxygen and having from 3 to 8 hydroxyl groups, reforming the fiber by injecting under constant pressure the fibroin-containing solution into a precipitating bath containing an acid, washing in a bath containing an organic substance as hereinbefore described, and elongating.

6. Process for manufacturing silk fiber which comprises dissolving silk fiber in a solution containing an alkali and a salt of nickel, reforming the fiber by precipitation, washing in a bath containing an organic substance composed of carbon, hydrogen and oxygen and having from 3 to 8 hydroxyl groups, and elongating.

7. Process for manufacturing silk fiber which comprises dissolving silk fiber in a solution containing an alkali and a nickel salt, reforming the fiber by precipitation in an acid bath, washing in a bath containing an organic substance composed of carbon, hydrogen and oxygen and having from 3 to 8 hydroxyl groups, and elongating.

8. Process for manufacturing silk fiber which comprises dissolving silk fiber in an alkalin solution containing a nickel salt and an organic substance composed of carbon, hydrogen and oxygen and having from 3 to 8 hydroxyl groups, reforming the fiber by precipitation, washing in a bath containing an organic substance as hereinbefore described, and elongating.

9. Process for manufacturing silk fiber which comprises dissolving silk fiber in an alkalin solution containing a salt of nickel and glycerine, reforming the fiber by precipitation, washing in a bath containing glycerine, and elongating.

10. Process for manufacturing silk fiber which comprises dissolving silk fiber in an alkalin solution containing a salt of nickel and glycerine, reforming the fiber by precipitation in a bath containing an acid, washing in a bath containing glycerine, and elongating.

11. Process for manufacturing silk fiber which comprises removing sericin from silk fiber, dissolving said fiber in an alkalin solution containing a salt of nickel and glycerine, reforming the fiber by precipitation in a bath containing an acid, washing in a bath containing glycerine, and elongating.

12. In the process of manufacturing animal fiber, the step which consists in dissolving animal fiber in a solution containing a nickel salt, an alkali and an organic substance composed of carbon, hydrogen and oxygen and having from 3 to 8 hydroxyl groups.

13. In the process of manufacturing animal fiber, the step which consists in dissolving animal fiber in a solution containing a nickel salt, potassium hydroxide, and glycerine.

14. In the process of manufacturing animal fiber, the steps which consist in passing a formed fiber through a bath containing an organic substance composed of carbon, hydrogen and oxygen and having from 3 to 8 hydroxyl groups, and elongating.

15. In the process of manufacturing animal fiber, the steps which consists in passing a formed fiber through a bath containing glycerine, and then elongating.

16. Process for the manufacture of animal fiber which comprises dissolving animal fiber in a suitable solvent, adding a coloring matter to the fiber containing solution, spinning in a bath containing a fiber precipitating agent, passing through a bath containing an organic substance composed of carbon, hydrogen and oxygen having from 3 to 8 hydroxyl groups and elongating.

17. Process for the manufacture of animal fiber which comprises dissolving animal fiber in a suitable solvent, adding a hardening agent to the solution thus obtained, reforming the fiber by precipitation, washing in a bath containing an organic substance composed of carbon, hydrogen and oxygen having from 3 to 8 hydroxyl groups and elongating.

18. Process for the manufacture of animal fiber which comprises dissolving animal fiber in a suitable solvent, adding a gelatinous substance to the solution thus obtained, reforming the fiber by precipitation, washing in a bath containing an organic substance composed of carbon, hydrogen and oxygen having from 3 to 8 hydroxyl groups and elongating.

19. Process for the manufacture of animal fiber which comprises dissolving animal fiber in a suitable solvent, adding a gelatinous substance and a hardening agent to the solution thus obtained, reforming the fiber by precipitation, washing in a bath containing an organic substance composed of carbon, hydrogen and oxygen having from 3 to 8 hydroxyl groups and elongating.

20. The process for the manufacture of animal fiber which consists in dissolving animal fiber in a solvent containing a compound of a metal, which solvent contains an organic substance to permit increased concentration of the metal compound in solution, and thereafter reforming the fiber by precipitation.

21. The process for the manufacture of animal fiber which consists in dissolving animal fiber in a solvent containing a compound of a metal selected from the group comprising copper and nickel and an organic substance to permit increased concentration of the said compound in solution, and thereafter reforming the fiber by precipitation.

22. A solvent for animal fiber containing a solution of a compound of a metal selected from the group consisting of copper and nickel and an organic substance to permit an increased concentration of the metal compound in solution.

23. A solvent for animal fiber containing a solution of a compound of a metal and an organic substance selected from the group consisting of glycerine and sucrose.

24. A solvent for animal fiber containing a solution of a metal hydroxide and an organic compound to permit an increased concentration of the metal hydroxide in solution.

25. A solvent for animal fiber containing an alkali, a solution of a metal hydroxide, and an organic compound to permit an increased concentration of the metal compound in solution.

26. A solvent for animal fiber containing an alkali, a solution of a hydroxide of a metal selected from the group consisting of copper and nickel, and an organic substance selected from the group consisting of glycerine and sucrose.

27. The process for the manufacture of animal fiber which consists in dissolving animal fiber in a solvent containing an alkali, a solution of a metal hydroxide and an organic substance selected from the group consisting of glycerine and sucrose, and thereafter reforming the fiber by precipitation.

28. The process for the manufacture of animal fiber which consists in dissolving animal fiber in a solvent containing an alkali, a hydroxide of a metal selected from the group consisting of copper and nickel, and an organic substance, to permit increased concentration of the metal hydroxide in solution, and thereafter reforming the fiber by precipitation.

29. A process for manufacturing animal fiber which consists in dissolving animal fiber in a solvent formed from a compound of a metal selected from the group comprising nickel and copper, an alkali and an organic substance, precipitating the fiber, washing it in a bath containing an organic elasticity imparting substance, and elongating.

30. A process for manufacturing animal fiber which consists in dissolving animal fiber in an alkaline solvent formed from a compound of a metal and an organic substance selected from the group comprising glycerine and sucrose, reforming the fiber by precipitation, washing in a bath containing an organic elasticity imparting substance, and elongating.

31. A process for manufacturing animal fiber which consists in dissolving animal fiber in a solvent formed from a compound of a metal selected from the group comprising nickel and copper, an alkali and an organic substance selected from the group comprising glycerine and sucrose, reforming the fiber by precipitation, washing in a bath containing glycerine, and elongating.

32. The process for the manufacture of animal fiber which consists in dissolving animal fiber in a solvent containing a compound of a metal selected from the group comprising copper and nickel, and a non-reducing sugar to permit increased concentration of the said compound in solution, and thereafter reforming the fiber by precipitation.

33. The process for the manufacture of animal fiber which consists in dissolving animal fiber in a solvent containing a compound of a metal selected from the group comprising copper and nickel, and sucrose to permit increased concentration of the said compound in solution, and thereafter reforming the fiber by precipitation.

In testimony whereof I affix my signature.

ABRAHAM P. FURMAN.